(No Model.)
W. L. HALL.
PULLEY.
No. 449,676. Patented Apr. 7, 1891.
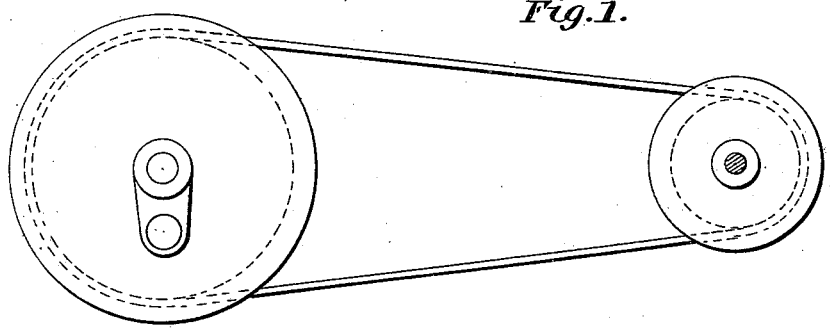
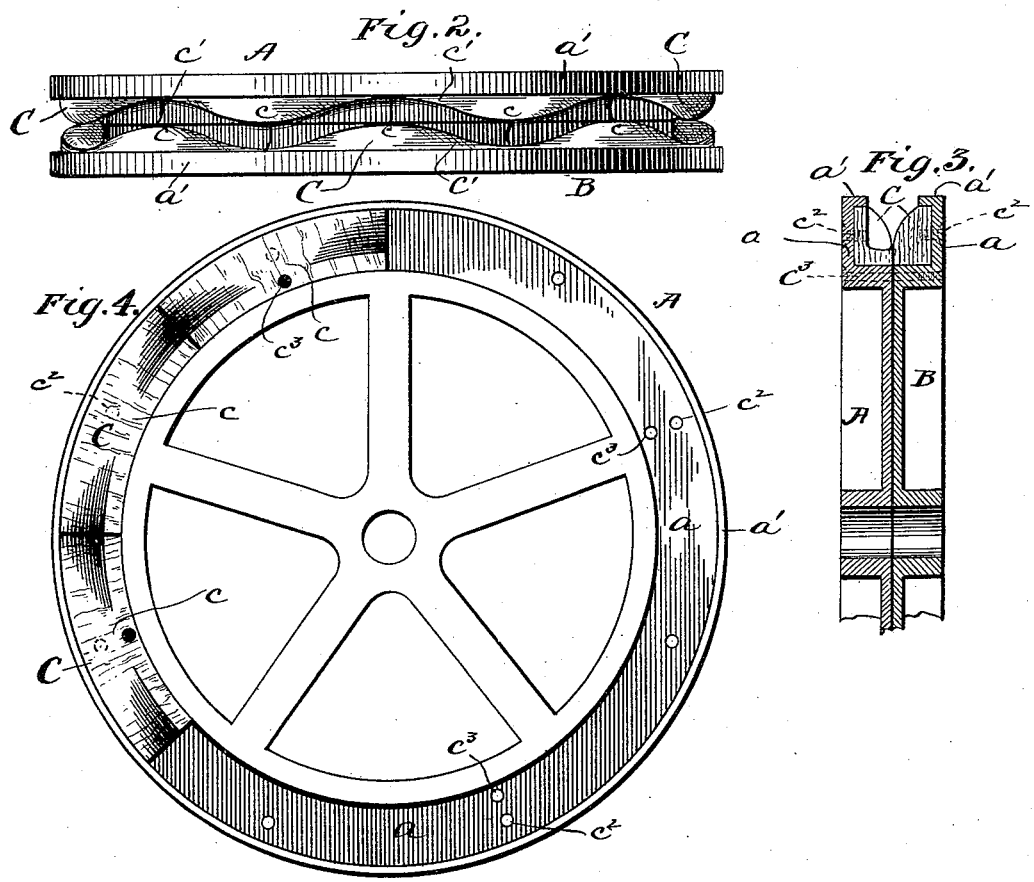
WITNESSES:
Frank S. Ober.
M. W. Rosenbaum
INVENTOR
William L. Hall,
BY
W. J. Johnston
ATTORNEY.

UNITED STATES PATENT OFFICE.

WILLIAM L. HALL, OF TROY, NEW YORK.

PULLEY.

SPECIFICATION forming part of Letters Patent No. 449,676, dated April 7, 1891.

Application filed October 13, 1890. Serial No. 367,938. (No model.)

*To all whom it may concern:*

Be it known that I, WILLIAM L. HALL, a citizen of the United States, residing in Troy, county of Rensselaer, and State of New York, have invented certain new and useful Improvements in Pulleys for Transmission of Power, of which the following is a specification.

My invention relates to improvements in grooved pulleys or sheaves adapted for the transmission of power through a cable, and has particular reference to the construction of the rim thereof, whereby slip of the cable is least liable to occur and worn parts may be readily replaced with new ones.

My invention consists in the construction and combination of parts, as hereinafter described and claimed.

In the accompanying drawings, Figure 1 is a general diagrammatic view of a system of pulleys and cable. Fig. 2 is a plan view of a single pulley. Fig. 3 is a section through the periphery of the same, taken on a radial plane. Fig. 4 is a side elevation of one-half of the pulley; and Fig. 5 is a perspective view of one of the wooden blocks which form the serpentine grooves in the periphery.

The pulley is formed of two parts A and B, each of which somewhat resembles a car-wheel, except that the outer edge of the flange $a$ has a flange $a'$ at a right angle to it, whereby when the two parts A and B are placed together the flanges $a$ form a groove around the periphery of the pulley, while the lateral flanges $a'$ $a'$ extend toward each other, so as to partially inclose the wooden blocks C. Each of the blocks C is sector-shaped, with the inner portion of such sector cut away on a curve having the same center as the outer curve. These blocks are cut with the grain of the wood radial and have a lateral thickness equal to one-half the space between the two flanges $a$ $a$, while the radial thickness of the blocks is such as to just fit between the rim of the pulley or the bottom of the groove and the lateral flanges $a'$. Each block has one side cut away in a gradual ogee curve each way from its center, so as to form a swell $c$ at the center and a depression $c'$ each side of it, the proportions being such that the curve formed by the two meeting depressions of two abutting blocks shall just equal, but be the reverse of, the curve of the swell $c$. The base of the depressions is at the same radial distance as the point where the base of the swell meets the side of the block, and this point is preferably about the middle of the radial thickness of the block. Therefore when a series of these blocks, which are duplicates of each other and interchangeable, are set in the annular groove of the pulley with the swells of the block on one side located opposite the meeting points of the blocks on the other side a sinuous or serpentine groove for a cable is formed. The blocks are to be secured in position, preferably, by screws $c^2$, while the two parts A and B of the pulley are separated, and the said two parts will then be secured together by bolts $c^3$; but it is obvious that the screws $c^2$ or other equivalent fastening means may be omitted, for when the parts are finally secured together displacement of the blocks is impossible.

Pulleys having sinuous or serpentine peripheral grooves are not new, and their advantages when driving or being driven by a cable are well known and need not be described herein. The operation will be clearly understood from the foregoing in connection with the drawings; but since the wear of the cable takes place almost entirely upon the swells or cams of the grooves it is advantageous to have these parts easily renewed and interchangeable, and such is the main object of my invention.

When the blocks have considerable peripheral length, as one-eighth of the complete circle, it is impossible to have the grain of the wood radial throughout its length, and it is of course desirable that where the wear is greatest there the resistance to wear shall be greatest, and such resistance is highest where the grain is most truly radial. Therefore I form the blocks so that the truest radial lines shall be at the swells, which, as shown, are central on the blocks. I may form each block with the highest point of its swell near one end and the lowest point of depression near the other end and still preserve the interchangeability of the blocks; but in this case I would form them so that the radial lines would be at the swells.

Having now described my invention, what I claim is—

A pulley composed of two parts A and B, having flanges $a$, terminating in lateral flanges $a'$, a series of wooden blocks C, secured in each side of the groove formed by the flanges, each of said blocks having a lateral swell $c$ and depressions $c'$, and the blocks of the series on one side having their swells opposite the depressions of the other series, substantially as described.

In witness whereof I have hereunto signed my name in the presence of two subscribing witnesses.

WILLIAM L. HALL.

Witnesses:
CHARLES S. BRINTNALL,
W. E. HAGAN.